United States Patent
He et al.

(10) Patent No.: US 12,456,496 B2
(45) Date of Patent: *Oct. 28, 2025

(54) VIDEO PROCESSING METHOD AND APPARATUS, ELECTRONIC DEVICE, AND COMPUTER READABLE STORAGE MEDIUM

(71) Applicant: Beijing Bytedance Network Technology Co., Ltd., Beijing (CN)

(72) Inventors: Yan He, Beijing (CN); Xin Li, Beijing (CN); Wenhai Zhang, Beijing (CN); Jinmin Li, Beijing (CN); Zhuang Xiong, Beijing (CN); Xinliang Deng, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/769,183

(22) Filed: Jul. 10, 2024

(65) Prior Publication Data

US 2024/0363148 A1 Oct. 31, 2024

Related U.S. Application Data

(63) Continuation of application No. 18/064,128, filed on Dec. 9, 2022, now Pat. No. 12,068,006, which is a
(Continued)

(30) Foreign Application Priority Data

Jun. 10, 2020 (CN) .......................... 202010525242.8

(51) Int. Cl.
*G11B 27/34* (2006.01)
*G06F 3/04847* (2022.01)
*G11B 27/034* (2006.01)

(52) U.S. Cl.
CPC .......... *G11B 27/34* (2013.01); *G06F 3/04847* (2013.01); *G11B 27/034* (2013.01)

(58) Field of Classification Search
CPC .... G11B 27/34; G11B 27/034; G06F 3/04847
See application file for complete search history.

(56) References Cited

U.S. PATENT DOCUMENTS 5,999,173 A 12/1999 Ubillos
7,786,999 B1 8/2010 Reid
(Continued)

FOREIGN PATENT DOCUMENTS

CN 104780417 A 7/2015
CN 104811629 A 7/2015
(Continued)

OTHER PUBLICATIONS

International Search Report and Written Opinion issued in corresponding International Application No. PCT/CN2021/095502 dated Aug. 20, 2021.
(Continued)

*Primary Examiner* — Girumsew Wendmagegn
(74) *Attorney, Agent, or Firm* — Astute IP Law Group

(57) ABSTRACT

The present disclosure provides a video processing method and apparatus, an electronic device, and a computer-readable storage medium, the video processing method includes: receiving a to-be-processed video; displaying, on a display interface, a preview image of the to-be-processed video through a video preview region, displaying an editing track of the to-be-processed video through a track editing region, and displaying at least one processing function through a processing function navigation region; and when receiving a trigger operation for any processing function, displaying, in the video preview region, a preview image of a processed video obtained by processing the any processing function,
(Continued)

and displaying, in the track editing region, an editing identifier corresponding to the any processing function. The editing identifier and the editing track of the to-be-processed video are superimposed and displayed in the track editing region.

20 Claims, 6 Drawing Sheets

Related U.S. Application Data continuation of application No. PCT/CN2021/095502, filed on May 24, 2021.

(56) References Cited

U.S. PATENT DOCUMENTS

| | | | |
|---|---|---|---|
| 12,068,006 B2* | 8/2024 | He | G11B 27/34 |
| 2004/0001079 A1* | 1/2004 | Zhao | G11B 27/034 |
| 2012/0042251 A1 | 2/2012 | Rodriguez | |
| 2017/0243611 A1* | 8/2017 | Buyuklu | G11B 27/036 |
| 2017/0294212 A1 | 10/2017 | Allen et al. | |
| 2018/0239524 A1 | 8/2018 | Snibbe et al. | |
| 2019/0051330 A1 | 2/2019 | Moore et al. | |

FOREIGN PATENT DOCUMENTS

| | | |
|---|---|---|
| CN | 109120997 A | 1/2019 |
| CN | 109495791 A | 3/2019 |
| CN | 110198486 A | 9/2019 |
| CN | 110381371 A | 10/2019 |
| CN | 110582018 A | 12/2019 |
| CN | 110636382 A | 12/2019 |
| CN | 111078348 A | 4/2020 |
| CN | 111629252 A | 9/2020 |
| JP | 2013538505 A | 10/2013 |
| JP | 2014030229 A | 2/2014 |
| KR | 20100086136 A | 7/2010 |
| KR | 1020120066122 A | 6/2012 |
| KR | 20130107863 A | 10/2013 |
| KR | 101528312 B1 | 6/2015 |
| WO | 2016035423 A1 | 3/2016 |

OTHER PUBLICATIONS

Extended European Search Report in 21822298.2, mailed Aug. 3, 2023, 8 pages.
M. Muchmore, "Apple iMovie for iPhone 4—Review 2017—PCMag UK", PC Mag UK, XP093150962, Available online at: <https://uk.pcmag.com/iphone-apps/22256/apple-imovie-foriphone-4>, Mar. 20, 2017, 10 pages.
Office Action for European Patent Application No. 21822298.2, mailed Apr. 17, 2024, 7 pages.
Pete Johns—Studio Live Today, "How to add music and audio in iMovie iOS (iPhone/iPad)", XP093150959, Available online at: <https://www.youtube.com/watch?v=VXYH-6jsHWO>, Jun. 30, 2019, 2 pages.
Themacudotcom, "iMovie for iPad & iPhone Tutorial: The iMovie Timeline & Clips", XP093150953, Available online at: <https://www.youtube.com/watch?v=VcNbCISQLSk>, Dec. 3, 2018, 2 pages.
Notice of Allowance for Korean Patent Application No. 10-2022-7043537, mailed Jun. 5, 2023, 6 pages.
Notice of Allowance for Japanese Patent Application No. 2022-576468, mailed Jun. 9, 2023, 5 pages.
Matthew Pullen, "iMovie tips: Editing video in iMovie (iPad tutorial 2020)", Available on Internet at: https://www.youtube.com/watch?v=CITgAAv18hg, May 16, 2020, 2 pages.
Summons to attend oral proceedings received for European Patent Application No. 21822298.2, mailed on Oct. 16, 2024, 10 pages.
Meyers, Justin, "How to Add More Video Clips to iMovie Projects on Your iPhone", iOS & iPhone : gadget hacks, May 1, 2019, 20 pages.
Decision to refuse a European Patent Application No. 21822298.2, mailed Mar. 28, 2025, 20 pages.
Extended European Search Report for European Patent Application No. 25179623.1, mailed on Aug. 28, 2025, 15 pages.
Stephenson, "How to Add TikTok Filters and Effects", Available online at: <https://web.archive.org/web/20200514011759/https://www.lifewire.com/how-to-add-tiktok-filters-effects-4782415>, XP093302385, Feb. 25, 2020, 14 pages.

* cited by examiner

VIDEO PROCESSING METHOD AND APPARATUS, ELECTRONIC DEVICE, AND COMPUTER READABLE STORAGE MEDIUM

CROSS-REFERENCE TO RELATED APPLICATION

The present application is a continuation of U.S. patent application Ser. No. 18/064,128 filed on Dec. 9, 2022, which is a continuation of International Patent Application No. PCT/CN2021/095502, filed on May 24, 2021, which claims priority of Chinese Patent Application No. 202010525242.8, filed on Jun. 10, 2020. All the aforementioned patent applications are hereby incorporated by reference in their entireties.

TECHNICAL FIELD

The present disclosure relates to the field of computer technologies, and specifically, to a video processing method and apparatus, an electronic device, and a computer-readable storage medium.

BACKGROUND

With the rapid development of the mobile Internet, the demand for video processing APPs (Application program) on a mobile terminal is also growing. The existing video processing APP either completely copies a function and a logic of the video processing software on a PC (Personal Computer) terminal, or simplifies the function and the logic of the video processing software on the PC terminal. The video processing function provided by the former is complex and difficult to use, while the latter cannot meet the requirements of user due to poor functional expandability.

SUMMARY

The part of the summary is provided so as to introduce conceptions in a brief form, and these conceptions will be described in detail in the subsequent part of detailed description. The part of the summary is not intended to identify key features or necessary features of the claimed technical solutions, nor is intended to limit the scope of the claimed technical solutions.

In a first aspect, an embodiment of the present disclosure provides a video processing method, comprising: receiving a to-be-processed video; displaying, on a display interface, a preview image of the to-be-processed video through a video preview region, displaying an editing track of the to-be-processed video through a track editing region, and displaying at least one processing function through a processing function navigation region; and when receiving a trigger operation for any processing function, displaying, in the video preview region, a preview image of a processed video obtained by processing the any processing function, and displaying, in the track editing region, an editing identifier corresponding to the any processing function. The editing identifier and the editing track of the to-be-processed video are superimposed and displayed in the track editing region.

In a second aspect, an embodiment of the present disclosure provides a video processing apparatus, comprising: a to-be-processed video receiving module, configured to receive a to-be-processed video; a to-be-processed video display module, configured to display, on a display interface, a preview image of the to-be-processed video through a video preview region, display an editing track of the to-be-processed video through a track editing region, and display at least one processing function through a processing function navigation region; and a to-be-processed video processing module, configured to: when receiving a trigger operation for any processing function, display, in the video preview region, a preview image of a processed video obtained by processing the any processing function, and display, in the track editing region, an editing identifier corresponding to the any processing function. The editing identifier and the editing track of the to-be-processed video are superimposed and displayed in the track editing region.

In a third aspect, an embodiment of the present disclosure provides an electronic device, comprising a memory and a processor. The memory stores computer programs; and the processor is configured to execute the computer programs to implement the method provided by the embodiment of the first aspect.

In a fourth aspect, an embodiment of the present disclosure provides a computer-readable storage medium, the computer-readable storage medium stores computer programs, and when the computer programs are executed by a processor, the method provided by the embodiment of the first aspect is implemented.

The beneficial effects of the technical solutions provided by embodiments of the present disclosure are:

In a process of processing a to-be-processed video, a preview image is displayed through a video preview region, an editing identifier is displayed through a track editing region, and a to-be-selected processing function is displayed through a processing function navigation region. After receiving that a user triggers a required processing function, a to-be-processed video clip is processed to obtain a processed video, and a preview image of the processed video is displayed in the video preview region, and the editing identifier corresponding to the processing function is displayed in the track editing region. In the solution, image preview, track editing, and processing function navigation in the video processing process are partitioned and a reasonable linkage mechanism is set, to ensure that the user can simply and conveniently obtain the rich processing functions when performing video processing by using the solution, thereby improving user experience. In addition, the solution can also improve functional expandability of applications, to further satisfy the requirements of the user and improve operation experience of the user.

BRIEF DESCRIPTION OF THE DRAWINGS

In order to more clearly explain the technical solution in the embodiments of the present disclosure, the drawings needed to be used in the description of the embodiments of the present disclosure will be briefly described below.

DETAILED DESCRIPTION

Figure 1:
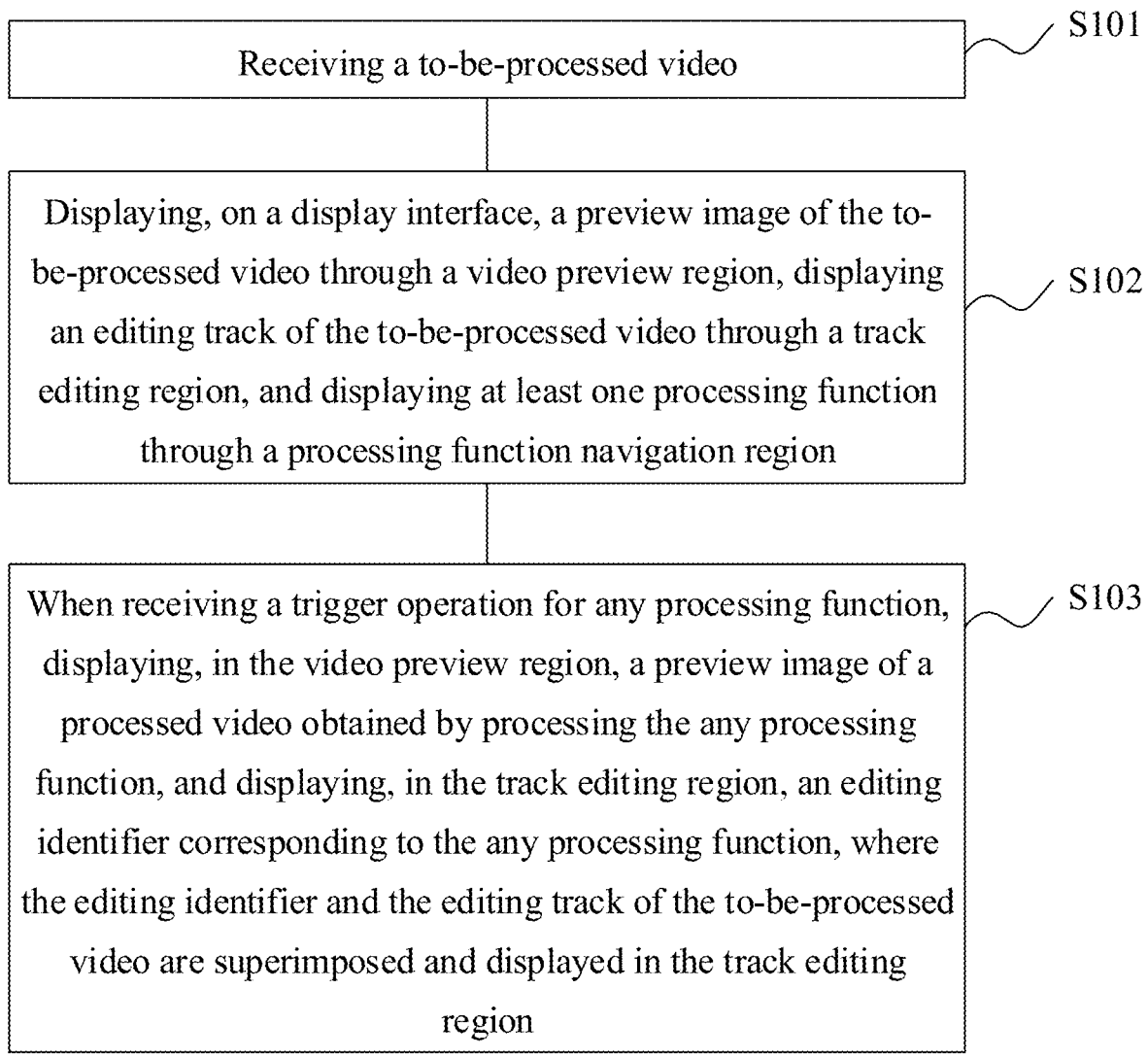
FIG. 1 is a schematic flowchart of a video processing method according to an embodiment of the present disclosure.

Embodiments of the present disclosure are described in detail below. Examples of the embodiments are shown in the accompanying drawings, in which the same or similar reference numerals always represent the same or similar elements or elements with the same or similar functions. The embodiments described below with reference to the accompanying drawings are exemplary and are only used to explain the present disclosure, and cannot be construed as a limitation to the present disclosure.

It may be understood by those skilled in the art that the singular forms "a", "an", "said", and "the" used herein may also include plural forms, unless specifically stated. It should be further understood that the term "include" and "comprise" used in the specification of the present disclosure refers to the existence of the features, integers, steps, operations, elements, and/or components, but does not exclude the existence or addition of one or more other features, integers, steps, operations, elements, components, and/or groups thereof. It should be understood that when we refer to an element as being "connected" or "coupled" to another element, it may be directly connected or coupled to another element, or there may be an intermediate element. Further, the "connection" or "coupling" used herein may include wireless connection or wireless coupling. The phrase "and/or" used herein includes all units or any unit and all combinations of one or more associated listed items.

In order to make the objective, technical solutions, and advantages of the present disclosure clearer, implementations of the present disclosure will be further described in detail with reference to the accompanying drawings.

FIG. 1 is a schematic flowchart of a video processing method according to an embodiment of the present disclosure. An execution body of the method may include an electronic device in which a video processing service application is installed. As shown in FIG. 1, the method may include the following steps.

Step S101: receiving a to-be-processed video.

For example, the to-be-processed video may include an unprocessed video uploaded by a user, or may include a processed draft video saved by the application, and may also include an unprocessed video formed by splicing a plurality of pictures loaded by the user.

Specifically, after opening the application, the user may select to upload a unprocessed video locally stored through a new video add button set in an interface of the application, or directly select the draft video that is processed at the last time and saved in the application. In addition, the user may also select to upload a plurality of pictures locally stored through the new video add button set in the interface of the application. The application may splice the received plurality of pictures into a video as the to-be-processed video. A manner of receiving the to-be-processed video is not limited in the present disclosure. The application performs related display and processing operations after receiving the to-be-processed video.

Step S102: displaying, on a display interface, a preview image of the to-be-processed video through a video preview region, displaying an editing track of the to-be-processed video through a track editing region, and displaying at least one processing function through a processing function navigation region.

For example, the display interface of the application may include three regions to display related information of the to-be-processed video, and the three regions respectively include: a video preview region, a track editing region, and a processing function navigation region.

Figure 2A:
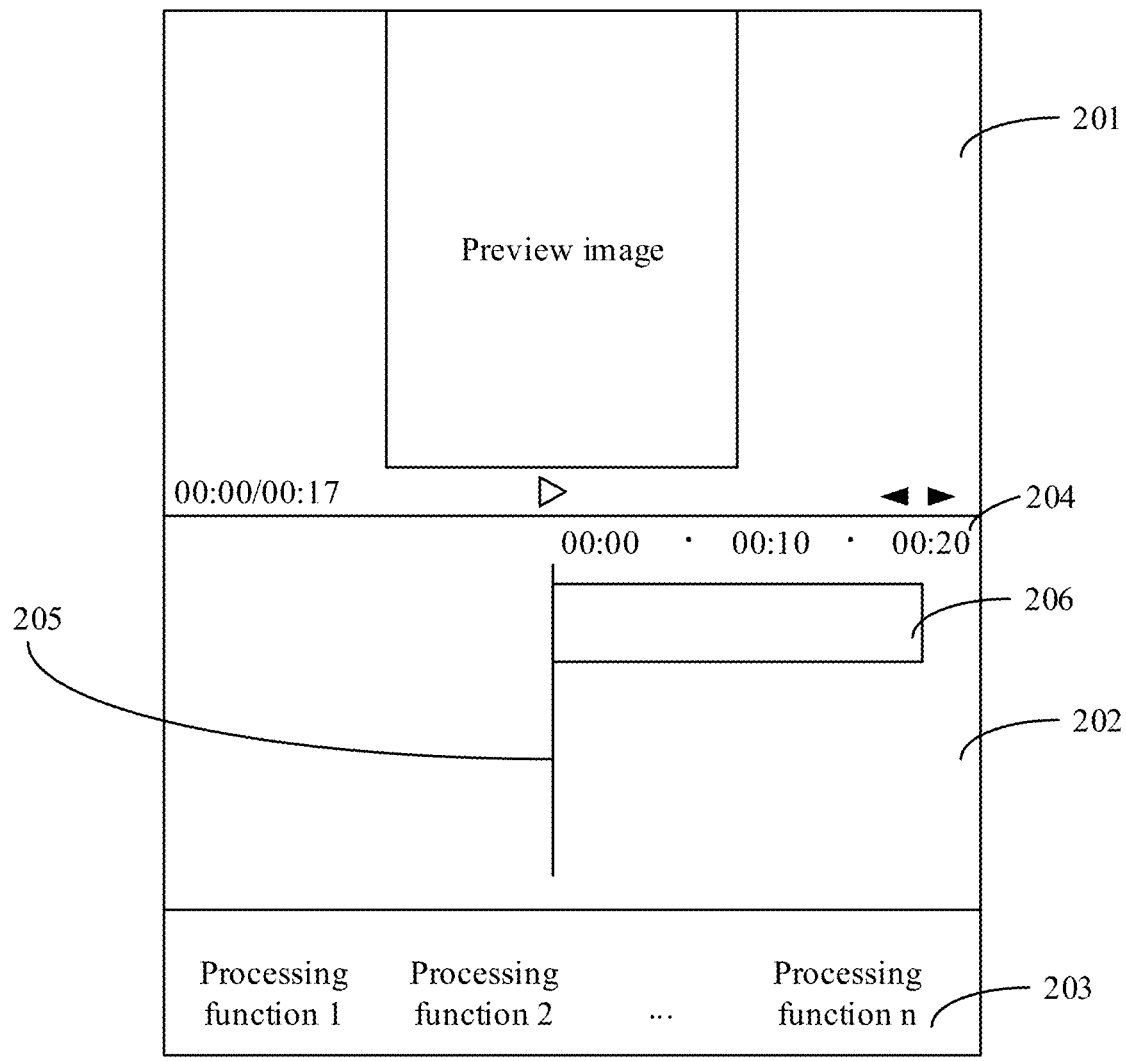
FIG. 2A is a schematic diagram of a display interface after a user uploads a to-be-processed video according to an embodiment of the present disclosure.

As shown in FIG. 2A, the display interface includes the video preview region 201, the track editing region 202, and the processing function navigation region 203.

In an embodiment, the video preview region 201 may be considered as a play interface, for displaying a preview image. The video preview region 201 may display the preview images corresponding to respective video clips of the to-be-processed video, or may also play the entire to-be-processed video.

The track editing region 202 is provided with a timeline 204 and a timeline ruler 205, for displaying at least one editing identifier. When the to-be-processed video is received, the track editing region 202 displays the editing track 206 of the to-be-processed video. A track start point of the editing track 206 of the to-be-processed video is aligned with a start point of the timeline 204. The respective video clips of the to-be-processed video are displayed on the editing track 206 of the to-be-processed video. The user may perform stretch and compression operations on the editing track 206 of the to-be-processed video in the length direction of the editing track 206 of the to-be-processed video. When receiving the stretch operation for the editing track 206, the application zooms out the timeline 204; and when receiving the compression operation for the editing track 206, the application zooms in the timeline 204.

The processing function navigation region 203 is used to display various processing functions for processing the to-be-processed video, such as an editing function, a filter function, a special effect function, or the like. The processing function navigation region 203 may include multi-level navigation bars, and each level of the multi-level navigation bars displays a corresponding processing function. The user may trigger corresponding processing functions by opening the multi-level navigation bars as needed. By setting the multi-level navigation bars in the processing function navigation region 203, the user may be provided with an operation interface that is simpler and easier to use, and more selectable processing functions. At the same time, the functional expandability of the application can also be improved, so as to satisfy the requirements of the user and improve operation experience of the user.

Step S103: when receiving a trigger operation for any processing function, displaying, in the video preview region, a preview image of a processed video obtained by processing the any processing function, and displaying, in the track editing region, an editing identifier corresponding to the any processing function, where the editing identifier and the editing track of the to-be-processed video are superimposed and displayed in the track editing region.

For example, the editing identifier indicates that the user triggers the corresponding processing function. In an embodiment, the editing identifier may include an editing track and an editing effect identifier.

Specifically, when the user issues a trigger operation for any processing function in the processing function navigation region, that is, the user issues a processing instruction to execute the processing function. After receiving the processing instruction to execute the processing function, the application uses the processing function to process the to-be-processed clip of the to-be-processed video, and obtains the processed video. The application displays the preview image of the processed video in the video preview region 201, and displays the editing identifier corresponding to the processing function in the track editing region 202. In addition, in the track editing region 202, the editing identifier corresponding to the processing function and the editing track of the to-be-processed video are displayed in an overlapping manner. In an embodiment, when the displayed editing identifier includes the editing track corresponding to the processing function, the application superimposes and displays the editing track corresponding to the processing function and the editing track of the to-be-processed video in parallel in the track editing region; and when the displayed editing identifier includes the editing effect identifier corresponding to the processing function, the application superimposes the editing effect identifier corresponding to the processing function on the editing track of the to-be-processed video for superposition display.

In the solution provided in the present disclosure, in a process of processing the to-be-processed video, the preview image is displayed through the video preview region, an editing identifier is displayed through the track editing region, and a to-be-selected processing function is displayed through the processing function navigation region. After receiving that a user triggers a required processing function, a to-be-processed video clip is processed to obtain a processed video, and a preview image of the processed video is displayed in the video preview region, and the editing identifier corresponding to the processing function is displayed in the track editing region. In the solution, image preview, track editing, and processing function navigation in the video processing process are partitioned and a reasonable linkage mechanism is set, to ensure that the user can simply and conveniently obtain the rich processing functions when performing video processing by using the solution, thereby improving user experience. In addition, the solution can also improve functional expandability of applications, to further satisfy the requirements of the user and improve operation experience of the user.

In an optional embodiment of the present disclosure, before the receiving a trigger operation for any processing function, the method may further include:
  receiving a slide operation on the track editing region, and determining a start editing point of the to-be-processed video.

The start editing point of the to-be-processed video may be selected by the user sliding, left and right, the editing track of the to-be-processed video in the track editing region. Specifically, the slide operation of the user on the track editing region may be understood as changing the relative position of the editing track of the to-be-processed video and the timeline ruler. Because the position of the timeline ruler is fixed (for example, located in the center of the track editing region) and perpendicular to the editing track of the to-be-processed video, the position of the timeline on the editing track of the to-be-processed video can be changed by the slide operation.

Figure 2B:
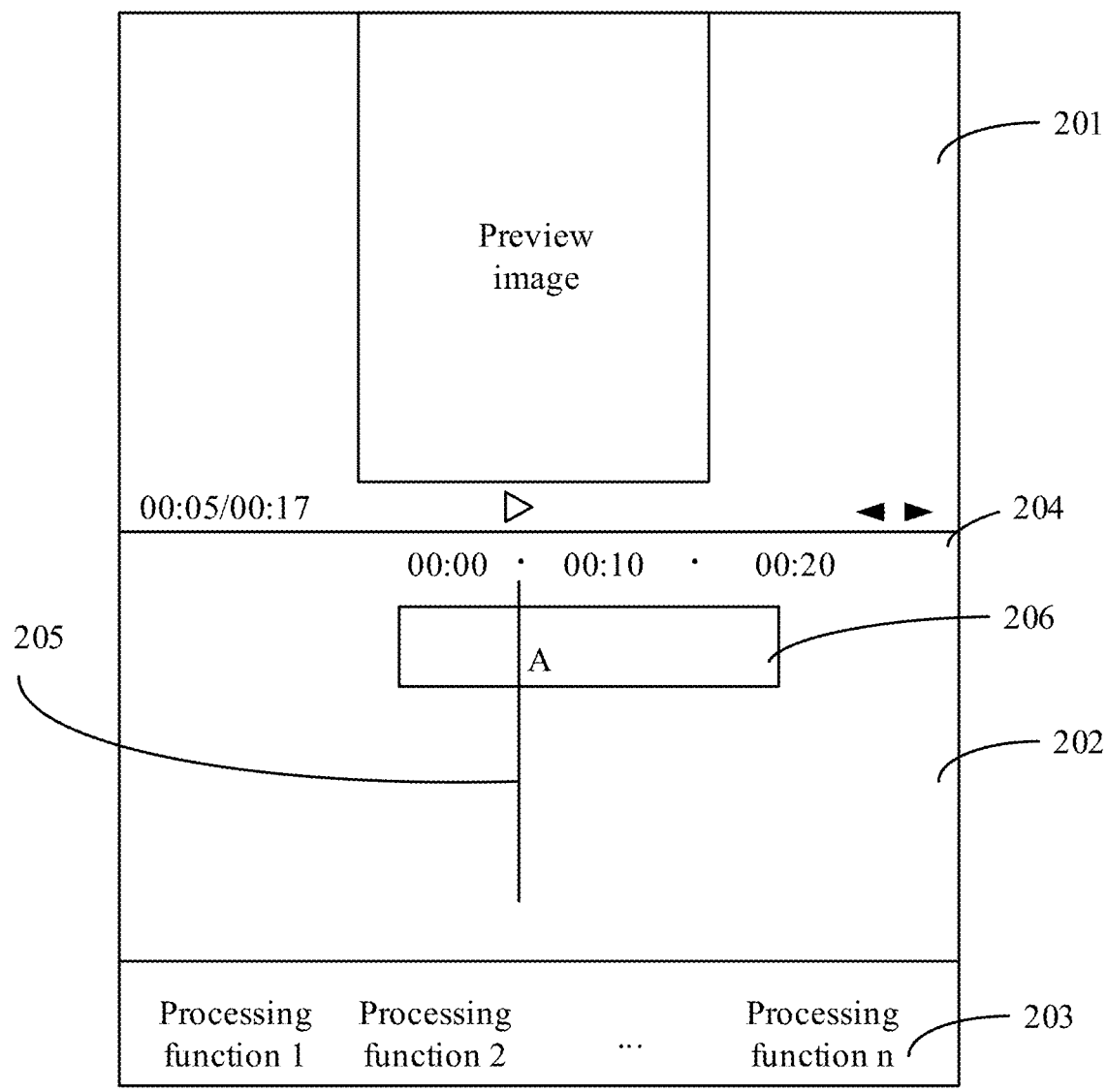
FIG. 2B is a schematic diagram of a display interface after a user sends a leftward slide operation to a track editing region in the display interface of FIG. 2A according to an embodiment of the present disclosure.

Specifically, a time point that is on the timeline and that corresponds to an intersection point between the timeline ruler and the editing track of the to-be-processed video is used as the start editing point of the to-be-processed video. After receiving the processing function selected by the user, the application may start processing the to-be-processed video from the start editing point. Using an example in which the user slides the editing track 206 of the to-be-processed video to the left in the track editing region 202 shown in FIG. 2A to obtain the case shown in FIG. 2B, as shown in FIG. 2B, the time point that is on the timeline 204 and that corresponds to the intersection point A between the timeline ruler 205 and the editing track 206 of the to-be-processed video is the corresponding start editing point. As can be seen from the example of FIG. 2B, the start editing point corresponds to a moment 00:05 on the timeline 204.

In an optional embodiment of the present disclosure, the when receiving a trigger operation for any processing function, displaying, in the video preview region, a preview image of a processed video obtained by processing the processing function, and displaying, in the track editing region, an editing identifier corresponding to the processing function may include:
  when receiving the trigger operation for the any processing function, obtaining a processing instruction corresponding to the processing function, where the processing instruction includes a function identifier and a processing parameter of the processing function;
  determining a to-be-processed video clip based on the function identifier and the start editing point, and processing the to-be-processed video clip based on the processing parameter to obtain the processed video; and
  based on the processed video, displaying the corresponding preview image in the video preview region, and displaying, in the track editing region, the editing identifier corresponding to the processing function, where the editing identifier takes the start editing point as a reference point and is aligned with the editing track of the to-be-processed video clip on a timeline.

It can be seen from the foregoing description that, when the user issues a trigger operation for any processing function in the processing function navigation region, that is, the user sends a processing instruction to execute the processing function, and the processing instruction includes a function identifier and a processing parameter of the processing function. For example, the function identifier is used to indicate the processing function selected by the user, and the processing parameter includes a parameter for processing the to-be-processed video clip. Taking the processing function of adding media resources as an example, the processing parameter thereof includes a corresponding media resource identifier.

Specifically, after receiving the processing instruction, the application first obtains duration corresponding to the corresponding processing function according to the function identifier in the processing instruction. In an embodiment, the duration corresponding to the processing function may be preset. For example, the duration corresponding to a sticker function may be set to 1 second, after receiving the function identifier of the sticker function, the application may determine that the duration corresponding to the processing function is 1 second. Then, the application determines the corresponding to-be-processed video clip according to the start editing point and the duration corresponding to the processing function. Specifically, the application uses the start editing point as a start point of the to-be-processed video clip, and uses the corresponding duration of the processing function as the duration of the to-be-processed video clip, thereby determining the to-be-processed video clip. After determining the to-be-processed video clip, the application processes the determined to-be-processed video clip by using the processing function corresponding to the function identifier and the corresponding processing parameter, to obtain the processed video.

Further, based on the obtained processed video, the application displays, in the video preview region, the preview image corresponding to the processed video. Only a preview image at a particular moment (for example, a moment of the start editing point) may be displayed, and the processed video may be further played based on the received play trigger operation.

After the function selected by the user is performed, the editing track corresponding to the processing function and the editing track of the to-be-processed video are superimposed and displayed in parallel in the track editing region, and the editing track corresponding to the processing function uses the start editing point as a reference point and is aligned with the editing track of the to-be-processed video clip on the timeline. Using an example in which the processing function is a special effect add function, the duration corresponding to the special effect add function is 0.3 seconds. When the start editing point corresponds to a moment 00:05 on the timeline, the application determines that the to-be-processed video clip is a to-be-processed video clip between 00:05 and 00:35. After the application adds a special effect to the to-be-processed video clip between 00:05 and 00:35, the application displays, in the track editing region, the editing track corresponding to the special effect add function in parallel with the editing track of the to-be-processed video, and the editing track corresponding to the special effect add function and the to-be-processed video clip both correspond to 00:05 to 00:35 on the timeline, that is, the two use the start editing point as the reference point and are aligned on the timeline. In addition, when processing the video, the application may also generate an inverse processing instruction of the current instruction. For example, the inverse instruction of the add instruction is the delete instruction, and the delete instruction includes the identifier and processing parameter corresponding to the processing function. The application stores the inverse processing instruction in an undo queue, and displays an undo button on the user interface. When receiving a click operation from the user on the undo button on the user interface, the inverse processing instruction is executed, that is, the processing function corresponding to the previous processing instruction is undid.

In an optional embodiment of the present disclosure, when the processing function is a processing function of adding media resources, the corresponding processing parameter includes a media resource identifier corresponding to the processing function, and the processing the to-be-processed video clip based on the processing parameter to obtain the processed video includes: obtaining a corresponding media resource based on the media resource identifier; and mounting the corresponding media resource on the to-be-processed video clip, to obtain the processed video.

In an embodiment, the application obtains the corresponding media content from the media resource library of the corresponding processing function according to the media resource identifier. The media resource library includes a plurality of media resources corresponding to the processing function, and each media resource has the corresponding media resource identifier, so that the corresponding media resource can be obtained by matching the media resource identifier. After obtaining the media resource and determining the to-be-processed video clip, the application mount the media resource to the to-be-processed video clip, to obtain the processed video.

Using an example of adding a filter function, the application obtains a corresponding filter resource package from a filter resource library according to a filter resource identifier, and adds the filter resource package to the to-be-processed video clip for rendering to obtain the processed video.

In addition, in an optional embodiment of the present disclosure, when the processing function is a processing function of adding media resources, the corresponding processing parameter includes a media resource identifier corresponding to the processing function and a to-be-added content parameter, and the processing the to-be-processed video clip based on the processing parameter to obtain the processed video includes: obtaining a corresponding media resource based on the media resource identifier; obtaining a to-be-added media resource based on the media resource and the to-be-added content parameter; and mounting the to-be-added media resource to the to-be-processed video clip, to obtain the processed video.

Taking a function of adding text as an example, the processing parameter received by the application includes a to-be-added text content parameter input by the user and a text effect resource package identifier selected by the user. The application obtains a corresponding text effect resource package from a text effect resource library according to the text effect resource package identifier, and processes the to-be-added text according to the text effect resource package, to obtain the processed to-be-added text with a text effect, and use it as a to-be-processed media resource, and the application adds the to-be-added text with the text effect to the to-be-processed video clip for rendering to obtain the processed video.

In an optional embodiment of the present disclosure, the displaying, in the track editing region, an editing identifier corresponding to the processing function includes: displaying, in the track editing region, an editing track corresponding to the processing function, where the editing track corresponding to the processing function takes the start editing point as a reference point and is aligned with an editing track of a to-be-processed video clip corresponding to the processing function on the timeline, and the editing track corresponding to the processing function and the editing track of the to-be-processed video clip corresponding to the processing function are superimposed and displayed.

Figure 3A:
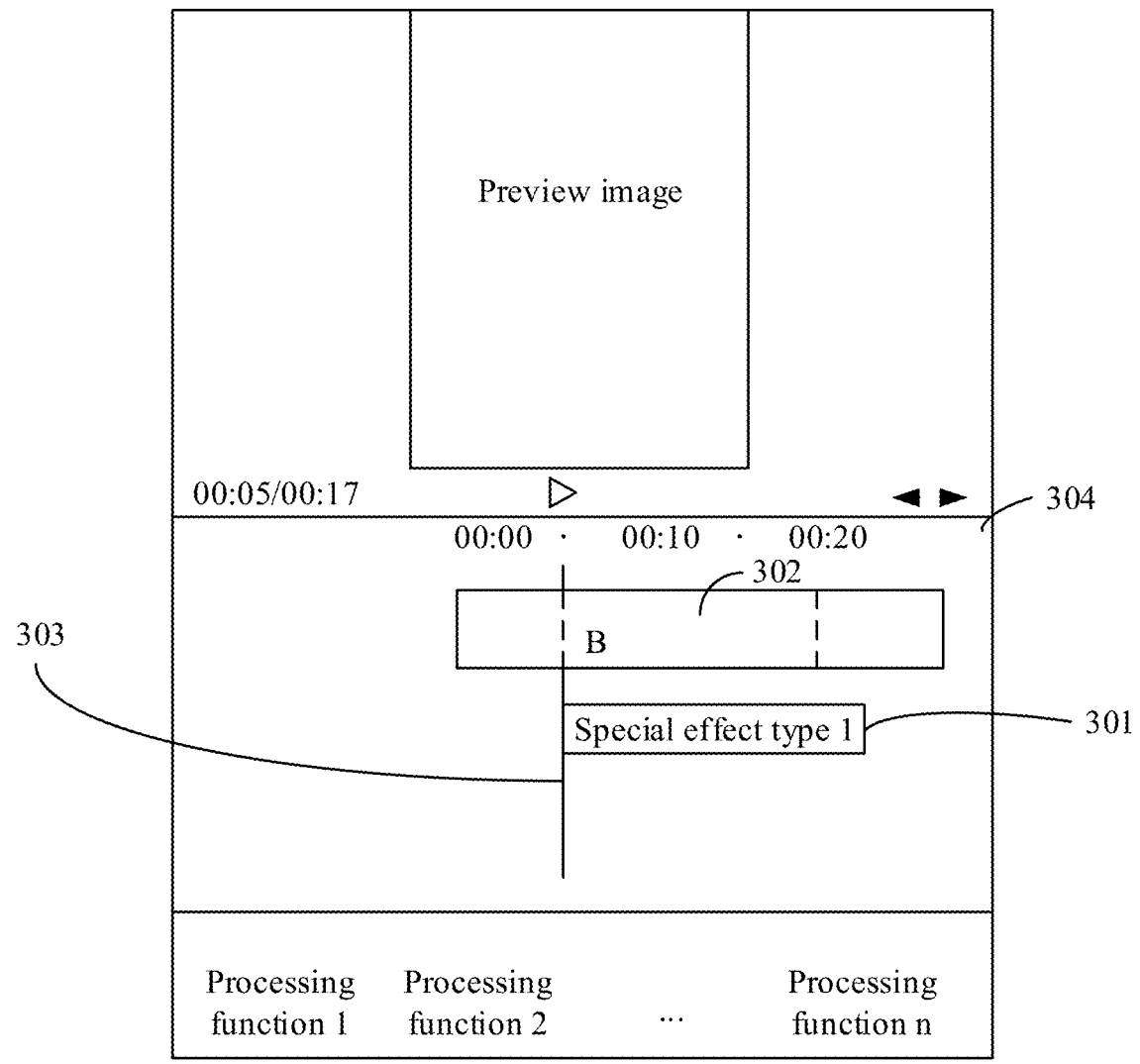
FIG. 3A is a schematic diagram of a track editing region corresponding to a special effect add processing function in an example according to an embodiment of the present disclosure.

The editing track corresponding to the processing function is displayed in parallel with the editing track of the to-be-processed video in an overlapping manner, and the editing track corresponding to the processing function is aligned with the corresponding to-be-processed video clip on the timeline, and the reference point at which the editing track corresponding to the processing function is aligned with the corresponding to-be-processed video clip is the start editing point of the to-be-processed video. Taking a case in which the processing function is a function of adding a special effect and the corresponding media resource is a special effect type 1 as an example, as shown in FIG. 3A, after a processing instruction of adding the special effect type 1 is executed, the editing track 301 corresponding to the special effect type 1 uses the start editing point B as the reference point, and is aligned with the editing track 302 of the corresponding to-be-processed video clip (that is, in the editing track 302 of the to-be-processed video clip, a video clip starting from the timeline ruler 303 to the right and ending with the dotted line in the editing track 302) on the timeline 304. It can be seen from FIG. 3A that the editing track 301 of the special effect type 1 and the editing track 302 of the to-be-processed video clip are aligned and correspond to 00:05 to 00:20 on the timeline 304.

In an optional embodiment of the present disclosure, the method may further include: when receiving a selection operation for the editing track corresponding to the processing function, displaying, in the processing function navigation region, a navigation bar corresponding to the processing function.

In an embodiment, the application may achieve the linkage between the track editing region and the processing function navigation region by receiving the selection operation of the user for the editing identifier. Specifically, when receiving that the user selects an editing identifier corresponding to a certain processing function in the track editing region, the application displays the navigation bar corresponding to the certain processing function in the processing function navigation region, and a processing function associated with the certain processing function is displayed in the navigation bar. For example, using an example in which the processing function is a function of adding a special effect, in FIG. 3A, when the user selects the editing track of the corresponding special effect type 1 by clicking, the processing function navigation region displays trigger buttons of processing functions, such as a processing function 1 (for example, "replacing special effect"), a processing function 2 (for example, "copying special effect"), . . . a processing function n (for example, "deleting special effect"), related to the function of adding the special effect.

In an optional embodiment of the present disclosure, the displaying, in the processing function navigation region, a navigation bar corresponding to the processing function includes: when receiving the selection operation for the editing track corresponding to the processing function, updating, by the application, state information in a visual model, and sending updated state information to a navigation bar manager by the visual model; and in response to the updated state information, creating the navigation bar by the navigation bar manager and displaying the navigation bar in the processing function navigation region.

For example, both the visual model and the navigation bar manager are functional components in the application.

For example, the state information indicates the select state of the editing identifier, and the state information can indicate whether the editing identifier is selected or not selected.

Specifically, after receiving the selection operation of the user for the editing identifier of a certain processing function, the application updates the state information of the editing identifier corresponding to the certain processing function in the visual model to the selected state, and the visual model sends the updated state information to the navigation bar manager, the navigation bar manager determines that the state information of the editing identifier corresponding to the certain processing function is updated to the selected state after receiving the updated state information, and then creates a navigation bar corresponding to the certain processing function corresponding to the editing identifier and displays the navigation bar. For example, the processing function associated with the certain processing function may be displayed in the navigation bar.

In an optional embodiment of the present disclosure, after the obtaining the processed video, the method may further include: sending a processing complete notification to a view model; and in response to the processing complete notification, sending updated editing identification information to a track manager by the view model, so that the track manager displays, in the track editing region, the editing identifier corresponding to the processing function according to the updated editing identification information.

For example, both the view model and the track manager are functional components in the application.

After obtaining the processed video, the application sends a processing complete notification to the view model, to notify the view model that processing for the current to-be-processed video clip is already completed. The view model sends the updated editing identification information to the track manager. For example, the updated editing identification information is determined according to the corresponding processing function. The track manager creates the corresponding editing identifier according to the updated editing identification information that is received, and displays the created editing identifier in the track editing region.

In an optional embodiment of the present disclosure, before the receiving a trigger operation for any processing function, the method further includes: receiving a selection operation on the editing track of the to-be-processed video, and determining a to-be-processed video clip of the to-be-processed video; and displaying, in the processing function navigation region, a navigation bar corresponding to a processing function used to process the to-be-processed video clip.

In an embodiment, in addition to sliding the editing track of the to-be-processed video in the track editing region to select the start editing point of the to-be-processed video, the user may also select the editing track of the to-be-processed video, or the system may automatically select the editing track of the to-be-processed video. The to-be-processed video may include at least one video clip, for example, the selected video clip is determined as the to-be-processed video clip. In this method of selecting a video clip, the application may also display, in the processing function navigation region, the navigation bar corresponding to the processing function used for processing the to-be-processed video clip when determining the to-be-processed video clip. That is, by receiving the selection operation of the user on the editing track of the to-be-processed video, the application displays, in the processing function navigation region, the navigation bar corresponding to the processing function used for processing the to-be-processed video clip. When the application receives the trigger operation of the user for any processing function in the navigation bar, processing for the to-be-processed video clip can be implemented.

In an optional embodiment of the present disclosure, the when receiving a trigger operation for any processing function, displaying, in the video preview region, a preview image of a processed video obtained by processing the processing function, and displaying, in the track editing region, an editing identifier corresponding to the processing function includes: when receiving the trigger operation for the any processing function, obtaining a processing instruction corresponding to the processing function; processing the to-be-processed video clip based on the processing instruction, to obtain the processed video; and based on the processed video, displaying the corresponding preview image in the video preview region, and displaying, in the track editing region, the editing identifier corresponding to the processing function, where the editing identifier and the editing track of the to-be-processed video are superimposed and displayed in the track editing region.

Specifically, it can be learned from the foregoing description that before the processing function is triggered, the application already determines the corresponding to-be-processed clip by receiving the selection operation of the user for the editing track of the to-be-processed video. When receiving the trigger operation of the user for the processing function, that is, when the user sends a processing instruction to execute the processing operation, the application processes the to-be-processed video clip based on the function identifier and the processing parameter in the processing instruction to obtain the processed video. After obtaining the processed video, the application displays the corresponding preview image in the video preview region, and displays the editing identifier corresponding to the processing function in the track editing region. For example, the editing identifier may include an editing effect identifier, and the editing effect identifier and the editing track of the to-be-processed video may be overlapped with each other and displayed in the track editing region in a superposition manner. In an embodiment, the selection operation for the editing track of the to-be-processed video may correspond to at least one processing function for editing and clipping the to-be-processed video.

Figure 3B:
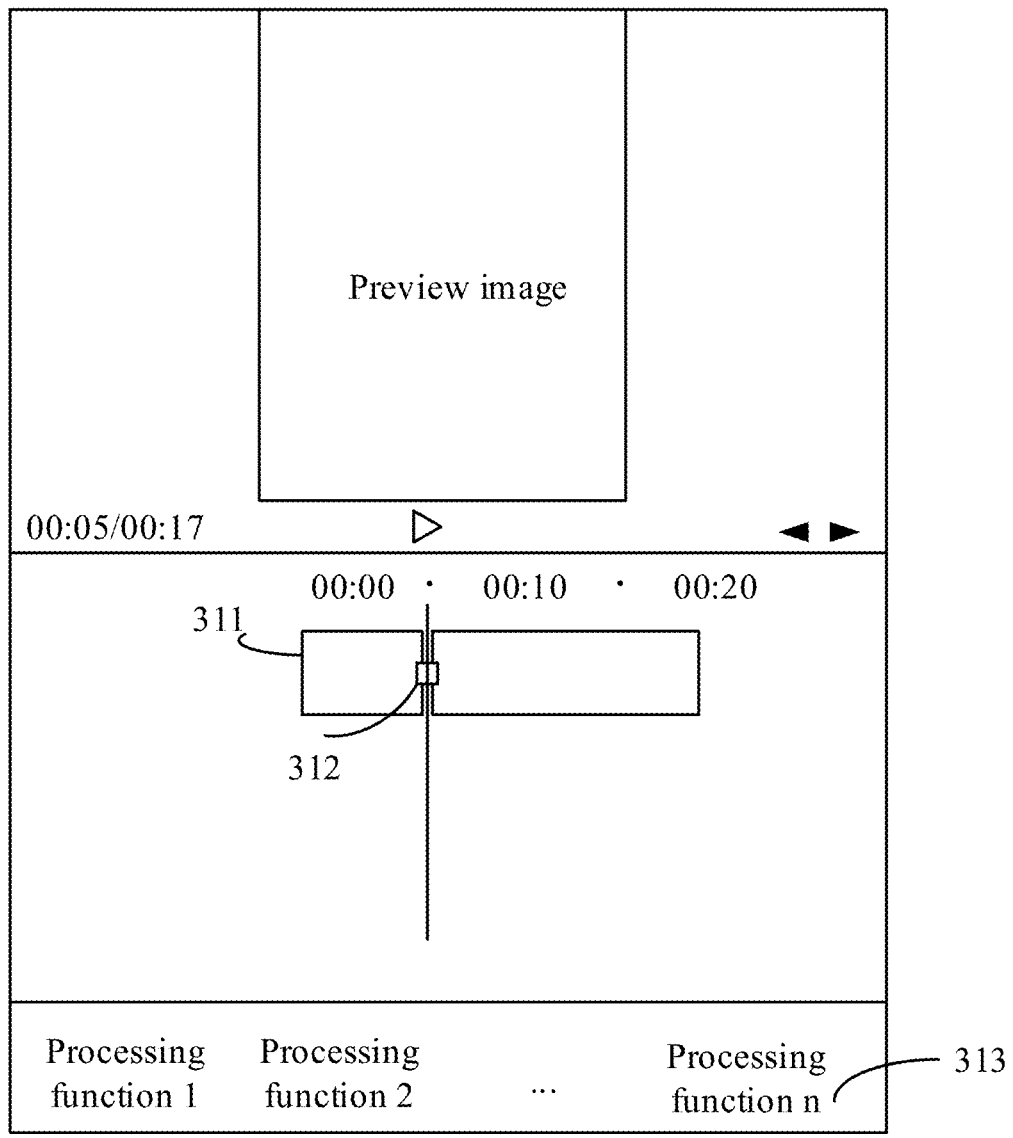
FIG. 3B is a schematic diagram of a track editing region corresponding to a video segmentation processing function in an example according to an embodiment of the present disclosure.

Description is provided by using an example in which the processing function is video segmentation. Referring to FIG. 3B, when receiving the selection operation of the user for the editing track of the to-be-processed video, the application displays, in the processing function navigation region 313, the navigation bar corresponding to the processing function for processing the to-be-processed video clip. When the application receives a click operation from the user on the video segmentation processing function in the navigation bar, and also receives a movement operation from the user for the to-be-processed video clip 311 in the editing track of the to-be-processed video, the application may obtain the processing instruction corresponding to the video segmentation function. The processing instruction may include a video segmentation function identifier and a processing parameter (for example, the processing parameter includes a video clip identifier of the current operation and a target position time of the video clip, etc.). The application processes the to-be-processed video clip based on the above-mentioned processing instruction to obtain the processed video. In addition, based on the processed video, the application may further display the corresponding preview image in the video preview region, and display the editing effect identifier 312 corresponding to the processing function in the track editing region. As shown in FIG. 3B, the editing effect identifier 312 and the editing track of the to-be-processed video are overlapped with each other and are superimposed and displayed in the track editing region.

In an optional embodiment of the present disclosure, the displaying, in the processing function navigation region, a navigation bar in which a processing function used to process the to-be-processed video clip is located includes: when receiving the selection operation from the user on the editing track of the to-be-processed video, updating, by the application, state information in a visual model, and sending updated state information to a navigation bar manager by the visual model; and in response to the updated state information, creating, by the application, the navigation bar by the navigation bar manager and displaying the navigation bar in the processing function navigation region.

By selecting the editing track of the to-be-processed video, linkage between the track editing region and the processing function navigation region can be implemented. When the user selects a video clip in the track editing region, the navigation bar corresponding to the processing function for processing the to-be-processed video clip is displayed in the processing function navigation region, and the processing function that can be used for processing the to-be-processed video clip is displayed in the navigation bar.

In addition, in an embodiment, through a trigger operation for the processing function in the processing function navigation region, the editing identifier corresponding to the triggered processing function may be displayed in the track editing region, thereby implementing the linkage between the processing function navigation region and the track editing region. After receiving the selection operation from the user for a processing function, the application updates the state information of the editing track corresponding to the processing function in the view model to the selected state, and the view model sends the updated state information to the track manager, the track manager determines that the state information of the editing track corresponding to the processing function is updated to the selected state after receiving the updated state information, and displays or selects the corresponding editing track. For example, when receiving the trigger operation for the processing function for video editing in the processing function navigation region, the application displays, in the track editing region, selection for the editing track of the to-be-processed video; and when receiving the trigger operation for a media resource add processing function in the processing function navigation region, the application displays the editing track corresponding to the processing function in the track editing region.

In an optional embodiment of the present disclosure, a video clip add button is displayed on the editing track of the to-be-processed video, and therefore, the method may further include: when receiving a video add operation by using the video clip add button, obtaining a to-be-added video clip corresponding to the video add operation; and updating the editing track of the to-be-processed video based on the to-be-added video clip.

In the process of processing the to-be-processed video, if the user still needs to add a new video clip, the user may click the video clip add button to trigger a video add operation, thereby uploading the to-be-added video clip from the local. After receiving the upload of the to-be-added video, the application updates the editing track of the to-be-processed video. In an embodiment, the application may determine the time point corresponding to the position of the timeline ruler. The application adds, according to the position of the time point on the timeline corresponding to the current to-be-processed video, the to-be-added video clip to the current to-be-processed video and updates the editing track of the to-be-processed video. In an embodiment, if the time point is located on the left of the center point of the timeline corresponding to the current to-be-processed video, the application adds the to-be-added video clip to the current to-be-processed video from the start point of the timeline; if the time point is located on the right of the center point of the timeline corresponding to the current to-be-processed video, the application adds the to-be-added video clip from the end time point of the current to-be-processed video. In addition, the application may further add the to-be-added video clip to the current to-be-processed video according to other implementations, and the present disclosure are not limited thereto.

In the embodiments of the present disclosure, the trigger operation includes clicking, text/voice input, touch input (for example, the movement operation of moving the to-be-processed video clip 311 in FIG. 3B), and other forms. When the user performs the trigger operation, the user sends the processing instruction to execute the corresponding processing function. The application may obtain the processing instruction of the corresponding processing function according to the trigger operation from the user.

Figure 4:
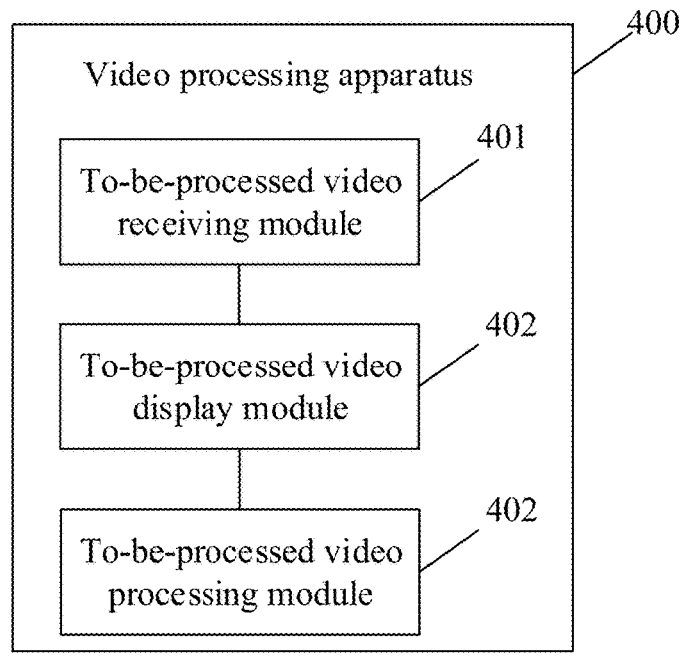
FIG. 4 is a block diagram of a structure of a video processing apparatus according to an embodiment of the present disclosure.

FIG. 4 is a block diagram of a structure of a video processing apparatus according to an embodiment of the present disclosure. As shown in FIG. 4, the apparatus 400 may include: a to-be-processed video receiving module 401, a to-be-processed video display module 402, and a to-be-processed video processing module 403, the to-be-processed video receiving module 401 is configured to receive a to-be-processed video; the to-be-processed video display module 402 is configured to display, on a display interface, a preview image of the to-be-processed video through a video preview region, display an editing track of the to-be-processed video through a track editing region, and display at least one processing function through a processing function navigation region; and the to-be-processed video processing module 403 is configured to: when receiving a trigger operation for any processing function, display, in the video preview region, a preview image of a processed video obtained by processing the any processing function, and display, in the track editing region, an editing identifier corresponding to the any processing function, where the editing identifier and the editing track of the to-be-processed video are superimposed and displayed in the track editing region.

In the solution provided in the present disclosure, in a process of processing a to-be-processed video, a preview image is displayed through a video preview region, an editing identifier is displayed through a track editing region, and a to-be-selected processing function is displayed through a processing function navigation region. After receiving that a user triggers a required processing function, a to-be-processed video clip is processed to obtain a processed video, and a preview image of the processed video is displayed in the video preview region, and the editing identifier corresponding to the processing function is displayed in the track editing region. In the solution, image preview, track editing, and processing function navigation in the video processing process are partitioned and a proper linkage mechanism is set, thereby ensuring that the user can simply and conveniently obtain the rich processing functions when performing video processing by using the solution, thus improving user experience. In addition, the solution can also improve functional expandability of applications, to further satisfy the requirements of the user and improve operation experience of the user.

In an optional embodiment of the present disclosure, the apparatus further includes a start editing point determination module, configured to: before receiving the trigger operation for any processing function, receive a slide operation on the track editing region, and determine a start editing point of the to-be-processed video.

In an optional embodiment of the present disclosure, the to-be-processed video processing module may include: a first processing instruction obtaining module, a first processed video obtaining module, and a first preview and track display module. The first processing instruction obtaining module is configured to: when receiving the trigger operation for any processing function, obtain a processing instruction corresponding to the processing function, and the processing instruction includes a function identifier and a processing parameter of the processing function. The first processed video obtaining module is configured to: determine a to-be-processed video clip based on the function identifier and the start editing point, and process the to-be-processed video clip based on the processing parameter, to obtain the processed video. The first preview and track display module is configured to: based on the processed video, display the corresponding preview image in the video preview region, and display, in the track editing region, the editing identifier corresponding to the processing function, and the editing identifier takes the start editing point as a reference point and is aligned with the editing track of the to-be-processed video clip on a timeline.

In an optional embodiment of the present disclosure, the processing parameter includes a media resource identifier corresponding to the processing function, and the first processed video obtaining module is specifically configured to: obtain a corresponding media resource based on the media resource identifier; and mount the corresponding media resource on the to-be-processed video clip, to obtain the processed video.

In an optional embodiment of the present disclosure, the first preview and track display module is specifically configured to: display, in the track editing region, an editing track corresponding to the processing function. The editing track corresponding to the processing function uses the start editing point as a reference point and is aligned with the editing track of the to-be-processed video clip corresponding to the processing function on the timeline, and the editing track corresponding to the processing function and the editing track of the to-be-processed video clip corresponding to the processing function are superimposed and displayed in parallel.

In an optional embodiment of the present disclosure, the apparatus may further include a first linkage module, configured to: when receiving a selection operation for the editing track corresponding to the processing function, display, in the processing function navigation region, a navigation bar corresponding to the processing function.

In an optional embodiment of the present disclosure, the first linkage module is specifically configured to: when receiving the selection operation, update state information in a visual model, and send updated state information to a navigation bar manager by the visual model; and in response to the updated state information, create the navigation bar by the navigation bar manager, and display the navigation bar in the processing function navigation region.

In an optional embodiment of the present disclosure, the apparatus further includes an editing identifier creating and display module, configured to: send a processing complete notification to a view model after obtaining the processed video; and in response to the processing complete notification, send updated editing identification information to a track manager by the view model, so that the track manager displays, in the track editing region, the editing identifier corresponding to the processing function according to the updated editing identification information.

In an optional embodiment of the present disclosure, the apparatus further includes a second linkage module, configured to: before receiving the trigger operation for any processing function, receive a selection operation on the editing track of the to-be-processed video, and determine a to-be-processed video clip of the to-be-processed video; and display, in the processing function navigation region, a navigation bar in which a processing function used to process the to-be-processed video clip is located.

In an optional embodiment of the present disclosure, the to-be-processed video processing module may include: a second processing instruction obtaining module, a second processed video obtaining module, and a second preview and track display module. The second processing instruction obtaining module is configured to: when receiving the trigger operation for any processing function, obtain a processing instruction corresponding to the processing function; the second processed video obtaining module is configured to process the to-be-processed video clip based on the processing instruction, to obtain the processed video; and the second preview and track display module is configured to: based on the processed video, display the corresponding preview image in the video preview region, and display, in the track editing region, the editing identifier corresponding to the processing function. The editing identifier and the editing track of the to-be-processed video are superimposed and displayed in the track editing region.

In an optional embodiment of the present disclosure, the second linkage module is specifically configured to: when receiving the selection operation, update state information in a visual model, and send updated state information to a navigation bar manager by the visual model; and in response to the updated state information, create the navigation bar by the navigation bar manager, and display the navigation bar in the processing function navigation region.

In an optional embodiment of the present disclosure, a video clip add button is displayed on the editing track of the to-be-processed video, and the apparatus further includes an editing track update module, configured to: when receiving a video add operation by using the video clip add button, obtain a to-be-added video clip corresponding to the video add operation; and update the editing track of the to-be-processed video based on the to-be-added video clip.

The above modules may be implemented as software components executed on one or more general-purpose processors, or as hardware such as programmable logic devices and/or application-specific integrated circuits that perform some functions or combinations thereof. In some embodiments, these modules may be embodied in the form of a software product, the software product may be stored in a non-volatile storage medium, the non-volatile storage medium includes computer programs for enabling a computer device (such as a personal computer, a server, a network device, or a mobile terminal, etc.) to implement the methods described in embodiments of the present disclosure. In an embodiment, the above modules may also be implemented on a single device or distributed on a plurality of devices. The functions of these modules may be combined with each other or further divided into a plurality of submodules.

The video processing apparatuses in each of the above embodiments may include a mobile terminal, such as a smartphone, a palmtop computer, a tablet computer, or a wearable device with a display screen, and may also include a computer device, such as a desktop computer, a notebook computer, or an all-in-one machine.

Those skilled in the art can clearly understand that, for the convenience and simplicity of description, for the specific working process of the modules in the video processing apparatus described above, reference may be made to the corresponding process in the foregoing method embodiments, and details are not described herein again.

Figure 5:
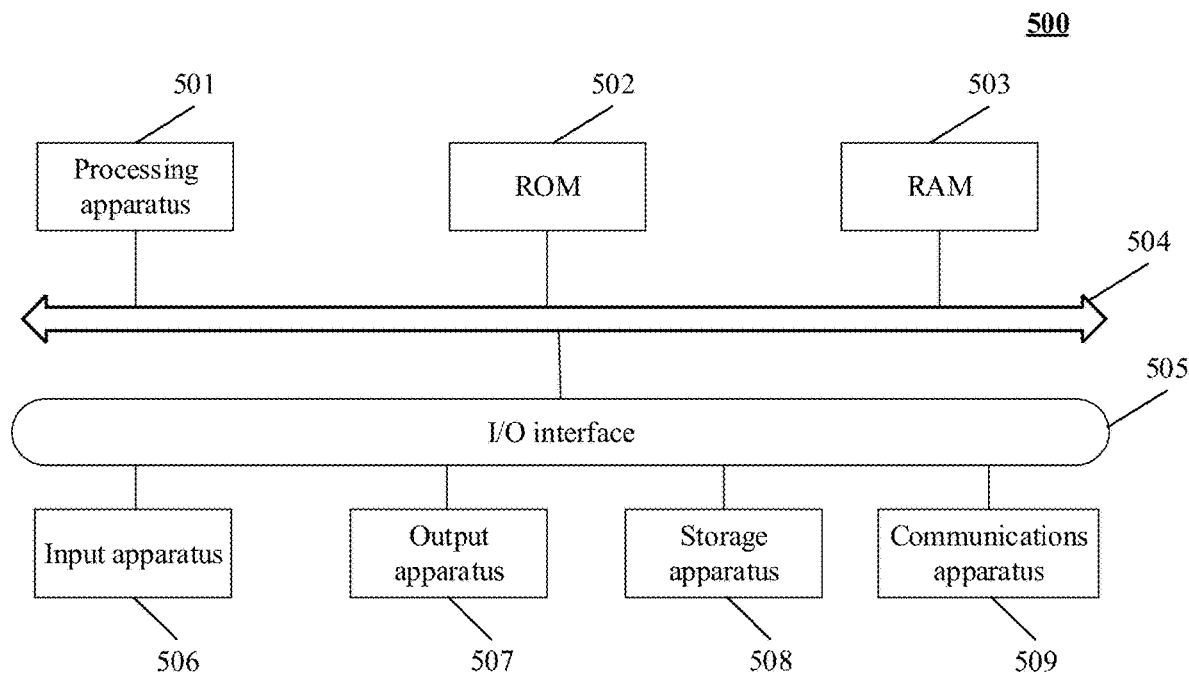
FIG. 5 is a schematic diagram of a structure of an electronic device according to an embodiment of the present disclosure.

The following shows, with reference to FIG. 5, a schematic diagram of a structure of an electronic device 500 (such as the terminal device or server that executes the method shown in FIG. 1) suitable for implementing the embodiments of the present disclosure. The electronic device in embodiments of the present disclosure may include, but not limited to, a mobile terminal such as a mobile phone, a notebook computer, a digital broadcast receiver, a PDA (personal digital assistant), a PAD (tablet computer), a PMP (portable multimedia player), a vehicle-mounted terminal (such as a vehicle-mounted navigation terminal), and a wearable device, as well as a fixed terminal such as a digital TV and a desktop computer. The electronic device shown in FIG. 5 is only an example, and should not impose any limitation to the function and scope of use of the embodiments of the present disclosure.

The electronic device includes: a memory and a processor, the memory is configured to store programs for executing the method of the above-described method embodiments, and the processor is configured to execute the programs stored in the memory. The processor herein may be referred to as a processing apparatus 501 described below, and the memory may include at least one selected from a group consisting of a read-only memory (ROM) 502, a random access memory (RAM) 503, and a storage apparatus 508 described below. Details are shown in the following.

As shown in FIG. 5, the electronic device 500 may include a processing apparatus (such as a central processing unit or a graphics processor) 501, which may perform various appropriate actions and processing according to programs stored in the read-only memory (ROM) 502 or programs loaded into the random access memory (RAM) 503 from the storage apparatus 508. In the RAM 503, various programs and data required for the operation of the electronic device 500 are also stored. The processing apparatus 501, the ROM 502, and the RAM 503 are connected to each other through a bus 504. An input/output (I/O) interface 505 is also connected to the bus 504.

Usually, the following apparatuses may be connected to the I/O interface 505, including an input apparatus 506, for example, a touch screen, a touch pad, a keyboard, a mouse, a camera, a microphone, an accelerometer, or a gyroscope; an output apparatus 507, for example, a liquid crystal display (LCD), a loudspeaker, or a vibrator; a storage apparatus 508 such as a magnetic tape or a hard disk; and a communications apparatus 509. The communications apparatus 509 may allow the electronic device 500 to perform wireless or wired communication with other devices to exchange data. Although FIG. 5 shows the electronic device with various apparatuses, it should be understood that it is not required to implement or own all the apparatuses shown. More or fewer apparatuses may alternatively be implemented or provided.

In particular, according to the embodiments of the present disclosure, the process described above with reference to the flowchart may be implemented as a computer software program. For example, an embodiment of the present disclosure includes a computer program product, which includes a computer program carried on a non-transient computer-readable medium, and the computer program includes program codes for executing the method shown in a flowchart. In such an embodiment, the computer program may be downloaded and installed from the network through the communications apparatus 509, or installed from the storage apparatus 508, or installed from the ROM 502. When the computer program is executed by the processing apparatus 501, the foregoing functions defined in the method of the embodiment of the present disclosure are executed.

It should be noted that the computer readable medium described above in the present disclosure may be a computer readable signal medium or a computer readable storage medium or any combination thereof. For example, the computer readable storage medium may be, but not limited to, an electric, magnetic, optical, electromagnetic, infrared, or semiconductor system, apparatus, or device, or any combination of them. More specific examples of the computer readable storage medium may include, but are not limited to: an electrical connection having one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination of them. In the present disclosure, the computer readable storage medium may be any tangible medium containing or storing a program that can be used by or in combination with an instruction execution system, apparatus, or device. In the present disclosure, the computer readable signal medium may include a data signal that propagates in a baseband or as a part of a carrier and carries computer readable program codes. The data signal propagating in such a manner may take a variety of forms, including but not limited to an electromagnetic signal, an optical signal, or any appropriate combination thereof. The computer readable signal medium may also be any computer readable medium other than the computer readable storage medium. The computer readable signal medium may send, propagate, or transmit a program used by or in combination with an instruction execution system, apparatus, or device. The program code contained on the computer readable medium may be transmitted by using any suitable medium, including but not limited to an electric wire, a fiber-optic cable, radio frequency (RF), and the like, or any appropriate combination of them.

In some implementations, a client and a server may communicate by using any currently known or future developed network protocol, such as HTTP (HyperText Transfer Protocol), and may be interconnected with digital data communication (for example, the communications network) in any form or medium. Examples of the communication network include a local area network ("LAN"), a wide area network ("WAN"), the Internet (for example, the Internet), and an end-to-end network (for example, an ad hoc end-to-end network), as well as any currently known or future developed network.

The above-mentioned computer-readable medium may be included in the above-mentioned electronic device; or may exist independently without being assembled into the electronic device.

The above-mentioned computer-readable medium carries one or more programs, and when the one or more programs are executed by the electronic device, the electronic device is enabled to: receive a to-be-processed video; display, on a display interface, a preview image of the to-be-processed video through a video preview region, display an editing track of the to-be-processed video through a track editing region, and display at least one processing function through a processing function navigation region; and when receiving a trigger operation for any processing function, display, in the video preview region, a preview image of a processed video obtained by processing the processing function, and display, in the track editing region, an editing identifier corresponding to the processing function. The editing identifier and the editing track of the to-be-processed video are superimposed and displayed in the track editing region.

Computer program code for performing the operations of the present disclosure may be written in one or more programming languages or a combination thereof. The above-mentioned programming languages include, but are not limited to, object-oriented programming languages such as Java, Smalltalk, C++, and conventional procedural programming languages such as "C" language or similar programming languages. The program code may be executed completely on the user computer, partially on the user computer, as an independent software package, partially on the user computer and partially on the remote computer, or completely on the remote computer or server. In the case involving the remote computer, the remote computer may be connected to the user computer through any kind of network, including a local area network (LAN) or a wide area network (WAN), or may be connected to an external computer (for example, connected through the Internet from an Internet Service Provider).

The flowcharts and block diagrams in the accompanying drawings illustrate system architectures, functions, and operations that may be implemented by the system, method, and computer program products according to the various embodiments of the present disclosure. In this regard, each block in the flowcharts or block diagrams may represent a module, a program segment, or a part of code, and the module, the program segment, or the part of code includes one or more executable instructions for implementing specified logic functions. It should also be noted that, in some alternative implementations, functions marked in the blocks may also occur in an order different from the order designated in the accompanying drawings. For example, two consecutive blocks can actually be executed substantially in parallel, and they may sometimes be executed in a reverse order, which depends on involved functions. It should also be noted that each block in the flowcharts and/or block diagrams and combinations of the blocks in the flowcharts and/or block diagrams may be implemented by a dedicated hardware-based system for executing specified functions or operations, or may be implemented by a combination of a dedicated hardware and computer instructions.

The modules or units described in the embodiments of the present disclosure may be implemented by software, or may be implemented by hardware. The name of a module or unit does not constitute a limitation on the module or unit itself. For example, a to-be-processed video receiving module may also be described as "a module for receiving the to-be-processed video".

The functions described above in the present disclosure may be executed at least in part by one or more hardware logic components. For example, without limitations, exemplary types of the hardware logic components that can be used include: a field programmable gate array (FPGA), an application specific integrated circuit (ASIC), an application specific standard product (ASSP), a system on chip (SOC), a complex programmable logic device (CPLD), and the like.

In the context of the present disclosure, a machine readable medium may be a tangible medium that may contain or store a program for use by or in combination with an instruction execution system, apparatus, or device. The machine readable medium may be a machine readable signal medium or a machine readable storage medium. The machine readable medium may include but not be limited to an electronic, magnetic, optical, electromagnetic, infrared, or semiconductor system, apparatus, or device, or any appropriate combination of them. More specific examples of the machine readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination of them.

Those skilled in the art can clearly understand that, for the convenience and brevity of the description, for the specific method implemented when the programs in the computer-readable medium described above are executed by the electronic device, reference may be made to the corresponding process in the above method embodiment, and details are not described herein again.

According to one or more embodiments of the present disclosure, the present disclosure provides a video processing method, comprising: receiving a to-be-processed video; displaying, on a display interface, a preview image of the to-be-processed video through a video preview region, displaying an editing track of the to-be-processed video through a track editing region, and displaying at least one processing function through a processing function navigation region; and when receiving a trigger operation for any processing function, displaying, in the video preview region, a preview image of a processed video obtained by processing the processing function, and displaying, in the track editing region, an editing identifier corresponding to the processing function. The editing identifier and the editing track of the to-be-processed video are superimposed and displayed in the track editing region.

According to one or more embodiments of the present disclosure, before the receiving a trigger operation for any processing function, the method further comprises: receiving a slide operation on the track editing region, and determining a start editing point of the to-be-processed video.

According to one or more embodiments of the present disclosure, the when receiving a trigger operation for any processing function, displaying, in the video preview region, a preview image of a processed video obtained by processing the processing function, and displaying, in the track editing region, an editing identifier corresponding to the processing function, comprises: when receiving the trigger operation for the any processing function, obtaining a processing instruction corresponding to the processing function, where the processing instruction comprises a function identifier and a processing parameter of the processing function; determining a to-be-processed video clip based on the function identifier and the start editing point, and processing the to-be-processed video clip based on the processing parameter to obtain the processed video; and based on the processed video, displaying the corresponding preview image in the video preview region and displaying, in the track editing region, the editing identifier corresponding to the processing function. The editing identifier takes the start editing point as a reference point and is aligned with an editing track of the to-be-processed video clip on a timeline.

According to one or more embodiments of the present disclosure, the processing parameter comprises the processing function and a media resource identifier corresponding to the processing function, the processing the to-be-processed video clip based on the processing parameter to obtain the processed video comprises: obtaining a corresponding media resource based on the media resource identifier; and mounting the corresponding media resource on the to-be-processed video clip, to obtain the processed video.

According to one or more embodiments of the present disclosure, the displaying, in the track editing region, the editing identifier corresponding to the processing function comprises: displaying, in the track editing region, an editing track corresponding to the processing function, where the editing track corresponding to the processing function takes the start editing point as a reference point and is aligned with an editing track of a to-be-processed video clip corresponding to the processing function on the timeline, and the editing track corresponding to the processing function and the editing track of the to-be-processed video clip corresponding to the processing function are superimposed and displayed.

According to one or more embodiments of the present disclosure, the method further comprises: when receiving a selection operation for the editing track corresponding to the processing function, displaying, in the processing function navigation region, a navigation bar corresponding to the processing function.

According to one or more embodiments of the present disclosure, the displaying, in the processing function navigation region, a navigation bar corresponding to the processing function comprises: when receiving the selection operation, updating state information in a visual model, and sending updated state information to a navigation bar manager by the visual model; and in response to the updated state information, creating the navigation bar by the navigation bar manager and displaying the navigation bar in the processing function navigation region.

According to one or more embodiments of the present disclosure, after the obtaining the processed video, the method further comprises: sending a processing complete notification to a view model; in response to the processing complete notification, sending updated editing identification information to a track manager by the view model, so that the track manager displays, in the track editing region, the editing identifier corresponding to the processing function according to the updated editing identification information.

According to one or more embodiments of the present disclosure, before the receiving a trigger operation for any processing function, the method further comprises: receiving a selection operation on the editing track of the to-be-processed video, and determining a to-be-processed video clip of the to-be-processed video; and displaying, in the processing function navigation region, a navigation bar in which a processing function used to process the to-be-processed video clip is located.

According to one or more embodiments of the present disclosure, the when receiving a trigger operation for any processing function, displaying, in the video preview region, a preview image of a processed video obtained by processing the processing function, and displaying, in the track editing region, an editing identifier corresponding to the processing function comprises: when receiving the trigger operation for the any processing function, obtaining a processing instruction corresponding to the processing function; processing the to-be-processed video clip based on the processing instruction, to obtain the processed video; and based on the processed video, displaying the corresponding preview image in the video preview region, and displaying, in the track editing region, the editing identifier corresponding to the processing function. The editing identifier and the editing track of the to-be-processed video are superimposed and displayed in the track editing region.

According to one or more embodiments of the present disclosure, the displaying, in the processing function navigation region, a navigation bar in which a processing function used to process the to-be-processed video clip is located comprises: when receiving the selection operation, updating state information in a visual model, and sending updated state information to a navigation bar manager by the visual model; and in response to the updated state information, creating the navigation bar by the navigation bar manager and displaying the navigation bar in the processing function navigation region.

According to one or more embodiments of the present disclosure, a video clip add button is displayed on the editing track of the to-be-processed video, and the method further comprises: when receiving a video add operation by using the video clip add button, obtaining a to-be-added video clip corresponding to the video add operation; and updating the editing track of the to-be-processed video based on the to-be-added video clip.

According to one or more embodiments of the present disclosure, the present disclosure provides a video processing apparatus, comprising: a to-be-processed video receiving module, configured to receive a to-be-processed video; a to-be-processed video display module, configured to display, on a display interface, a preview image of the to-be-processed video through a video preview region, display an editing track of the to-be-processed video through a track editing region, and display at least one processing function through a processing function navigation region; and a to-be-processed video processing module, configured to: when receiving a trigger operation for any processing function, display, in the video preview region, a preview image of a processed video obtained by processing the processing function, and display, in the track editing region, an editing identifier corresponding to the processing function. The editing identifier and the editing track of the to-be-processed video are superimposed and displayed in the track editing region.

According to one or more embodiments of the present disclosure, the apparatus further includes a start editing point determination module, configured to: before receiving the trigger operation for any processing function, receive a slide operation on the track editing region, and determine a start editing point of the to-be-processed video.

According to one or more embodiments of the present disclosure, the to-be-processed video processing module may include: a first processing instruction obtaining module, a first processed video obtaining module, and a first preview and track display module. The first processing instruction obtaining module is configured to: when receiving the trigger operation for any processing function, obtain a processing instruction corresponding to the processing function, and the processing instruction includes a function identifier and a processing parameter of the processing function. The first processed video obtaining module is configured to: determine a to-be-processed video clip based on the function identifier and the start editing point, and process the to-be-processed video clip based on the processing parameter, to obtain the processed video. The first preview and track display module is configured to: based on the processed video, display the corresponding preview image in the video preview region, and display, in the track editing region, the editing identifier corresponding to the processing function, and the editing identifier takes the start editing point as a reference point and is aligned with the editing track of the to-be-processed video clip on a timeline.

According to one or more embodiments of the present disclosure, the processing parameter includes a media resource identifier corresponding to the processing function, and the first processed video obtaining module is specifically configured to: obtain a corresponding media resource based on the media resource identifier; and mount the corresponding media resource on the to-be-processed video clip, to obtain the processed video.

According to one or more embodiments of the present disclosure, the first preview and track display module is specifically configured to: display, in the track editing region, an editing track corresponding to the processing function. The editing track corresponding to the processing function uses the start editing point as a reference point and is aligned with the editing track of the to-be-processed video clip corresponding to the processing function on the timeline, and the editing track corresponding to the processing function and the editing track of the to-be-processed video clip corresponding to the processing function are superimposed and displayed in parallel.

According to one or more embodiments of the present disclosure, the apparatus may further include a first linkage module, configured to: when receiving a selection operation for the editing track corresponding to the processing function, display, in the processing function navigation region, a navigation bar corresponding to the processing function.

According to one or more embodiments of the present disclosure, the first linkage module is specifically configured to: when receiving the selection operation, update state information in a visual model, and send updated state information to a navigation bar manager by the visual model; and in response to the updated state information, create the navigation bar by the navigation bar manager, and display the navigation bar in the processing function navigation region.

According to one or more embodiments of the present disclosure, the apparatus further includes an editing identifier creating and display module, configured to: send a processing complete notification to a view model after obtaining the processed video; and in response to the processing complete notification, send updated editing identification information to a track manager by the view model, so that the track manager displays, in the track editing region, the editing identifier corresponding to the processing function according to the updated editing identification information.

According to one or more embodiments of the present disclosure, the apparatus further includes a second linkage module, configured to: before receiving the trigger operation for any processing function, receive a selection operation on the editing track of the to-be-processed video, and determine a to-be-processed video clip of the to-be-processed video; and display, in the processing function navigation region, a navigation bar in which a processing function used to process the to-be-processed video clip is located.

According to one or more embodiments of the present disclosure, the to-be-processed video processing module may include: a second processing instruction obtaining module, a second processed video obtaining module, and a second preview and track display module. The second processing instruction obtaining module is configured to: when receiving the trigger operation for any processing function, obtain a processing instruction corresponding to the processing function; the second processed video obtaining module is configured to process the to-be-processed video clip based on the processing instruction, to obtain the processed video; and the second preview and track display module is configured to: based on the processed video, display the corresponding preview image in the video preview region, and display, in the track editing region, the editing identifier corresponding to the processing function. The editing identifier and the editing track of the to-be-processed video are superimposed and displayed in the track editing region.

According to one or more embodiments of the present disclosure, the second linkage module is specifically configured to: when receiving the selection operation, update state information in a visual model, and send updated state information to a navigation bar manager by the visual model; and in response to the updated state information, create the navigation bar by the navigation bar manager, and display the navigation bar in the processing function navigation region.

According to one or more embodiments of the present disclosure, a video clip add button is displayed on the editing track of the to-be-processed video, and the apparatus further includes an editing track update module, configured to: when receiving a video add operation by using the video clip add button, obtain a to-be-added video clip corresponding to the video add operation; and update the editing track of the to-be-processed video based on the to-be-added video clip.

The above descriptions are merely the illustrations of the alternative embodiments of the present disclosure and the explanations of the technical principles involved. Those skilled in the art should understand that the scope of the disclosure involved in the present disclosure is not limited to the technical solutions formed by a specific combination of the technical features described above, and shall also cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated particular order or in a sequential order. Under certain circumstances, multitasking and parallel processing may be advantageous. Similarly, while some specific implementation details are included in the above discussions, these shall not be construed as limitations to the scope of the present disclosure. Some features described in the context of a separate embodiment may also be implemented in a combination in a single embodiment. Conversely, various features described in the context of a single embodiment may also be implemented in various embodiments individually or in a plurality of embodiments in any appropriate sub-combination.

Although the present subject matter has been described in a language specific to structural features and/or methodlogical acts, it will be appreciated that the subject matter defined in the appended claims is not necessarily limited to the particular features or acts described above. Rather, the particular features and acts described above are merely exemplary forms for implementing the claims.

The invention claimed is:

1. A video processing method, comprising:
   displaying, on a display interface, a preview image of a to-be-processed video in a video preview region, displaying an editing track of the to-be-processed video in a track editing region, and displaying at least one editing function in an editing function navigation region; and
   in response to receiving a trigger operation for an editing function of the at least one editing function, displaying, in the video preview region, a preview image of a processed video obtained by processing the editing function, and displaying, in the track editing region, an editing identifier corresponding to the editing function,
   wherein before the receiving a trigger operation for an editing function of the at least one editing function, the method further comprises:
   in response to receiving a first selection operation on the editing track of the to-be-processed video, determining a first to-be-processed video clip, that is selected, of the to-be-processed video; and
   displaying, in the editing function navigation region, a navigation bar in which a first editing function used to process the first to-be-processed video clip is located.

2. The method according to claim 1, wherein before the receiving a trigger operation for an editing function of the at least one editing function, the method further comprises:
   in response to receiving a slide operation on the track editing region, determining a start editing point of the to-be-processed video.

3. The method according to claim 2, wherein the in response to receiving a trigger operation for an editing function of the at least one editing function, displaying, in the video preview region, a preview image of a processed video obtained by processing the editing function, and displaying, in the track editing region, an editing identifier corresponding to the editing function, comprises:
   in response to receiving the trigger operation for the editing function, obtaining a processing instruction corresponding to the editing function, wherein the processing instruction comprises a function identifier and a processing parameter of the editing function;
   determining a second to-be-processed video clip based on the function identifier and the start editing point, and processing the second to-be-processed video clip based on the processing parameter to obtain the processed video; and
   based on the processed video, displaying the corresponding preview image in the video preview region and displaying, in the track editing region, the editing identifier corresponding to the editing function,
   wherein the editing identifier takes the start editing point as a reference point and is aligned with an editing track of the second to-be-processed video clip on a timeline.

4. The method according to claim 3, wherein the processing parameter comprises a media resource identifier corresponding to the editing function,
   the processing the second to-be-processed video clip based on the processing parameter to obtain the processed video comprises:
   obtaining a corresponding media resource based on the media resource identifier; and
   mounting the corresponding media resource on the second to-be-processed video clip, to obtain the processed video.

5. The method according to claim 4, wherein the displaying, in the track editing region, the editing identifier corresponding to the editing function comprises:
   displaying, in the track editing region, the editing track corresponding to the editing function, wherein the editing track corresponding to the editing function takes the start editing point as a reference point and is aligned with an editing track of a to-be-processed video clip corresponding to the editing function on the timeline, and the editing track corresponding to the editing function and the editing track of the to-be-processed video clip corresponding to the editing function are at least partially overlapped in a direction perpendicular to an extension direction of the editing track corresponding to the editing function and the editing track of the to-be-processed video clip corresponding to the editing function for overlay display.

6. The method according to claim 5, further comprising:
in response to receiving a second selection operation for the editing track corresponding to the editing function, displaying, in the editing function navigation region, a navigation bar corresponding to the editing function.

7. The method according to claim 3, wherein the displaying, in the track editing region, the editing identifier corresponding to the editing function comprises:
displaying, in the track editing region, the editing track corresponding to the editing function, wherein the editing track corresponding to the editing function takes the start editing point as a reference point and is aligned with an editing track of a to-be-processed video clip corresponding to the editing function on the timeline, and the editing track corresponding to the editing function and the editing track of the to-be-processed video clip corresponding to the editing function are at least partially overlapped in a direction perpendicular to an extension direction of the editing track corresponding to the editing function and the editing track of the to-be-processed video clip corresponding to the editing function for overlay display.

8. The method according to claim 7, further comprising:
in response to receiving a second selection operation for the editing track corresponding to the editing function, displaying, in the editing function navigation region, a navigation bar corresponding to the editing function.

9. The method according to claim 8, wherein the displaying, in the editing function navigation region, a navigation bar corresponding to the editing function comprises:
in response to receiving the second selection operation, updating state information in a visual model, and sending updated state information to a navigation bar manager by the visual model; and
in response to the updated state information, creating the navigation bar by the navigation bar manager and displaying the navigation bar in the editing function navigation region.

10. The method according to claim 3, wherein after the obtaining the processed video, the method further comprises:
sending a processing complete notification to a view model;
in response to the processing complete notification, sending updated editing identification information to a track manager by the view model, so that the track manager displays, in the track editing region, the editing identifier corresponding to the editing function according to the updated editing identification information.

11. The method according to claim 1, wherein the in response to receiving a trigger operation for an editing function of the at least one editing function, displaying, in the video preview region, a preview image of a processed video obtained by processing the editing function, and displaying, in the track editing region, an editing identifier corresponding to the editing function, comprises:
in response to receiving the trigger operation for the editing function, obtaining a processing instruction corresponding to the editing function;
processing the first to-be-processed video clip based on the processing instruction, to obtain the processed video; and
based on the processed video, displaying the corresponding preview image in the video preview region, and displaying, in the track editing region, the editing identifier corresponding to the editing function, wherein the editing identifier and the editing track of the to-be-processed video are overlaid and displayed in the track editing region.

12. The method according to claim 1, wherein the displaying, in the editing function navigation region, a navigation bar in which a first editing function used to process the first to-be-processed video clip is located comprises:
in response to receiving the first selection operation, updating state information in a visual model, and sending updated state information to a navigation bar manager by the visual model; and
in response to the updated state information, creating the navigation bar by the navigation bar manager and displaying the navigation bar in the editing function navigation region.

13. The method according to claim 1, wherein the editing identifier comprises an editing effect identifier corresponding to the editing function, the editing effect identifier corresponding to the editing function is overlaid on the editing track of the to-be-processed video for overlay display; or
the editing identifier comprises an editing track corresponding to the editing function, the editing track corresponding to the editing function and the editing track of the to-be-processed video are arranged side by side and are overlaid in the track editing region for overly display.

14. The method according to claim 1, wherein a video clip add button is displayed on the editing track of the to-be-processed video, and
the method further comprises:
in response to receiving a video add operation by using the video clip add button, obtaining a third to-be-added video clip corresponding to the video add operation; and
updating the editing track of the to-be-processed video based on the third to-be-added video clip.

15. An electronic device, comprising a memory and a processor, wherein
the memory stores computer programs; and
the processor is configured to execute the computer programs, wherein when the computer programs are executed, the electronic device is caused to implement a video processing method, which comprises:
displaying, on a display interface, a preview image of a to-be-processed video in a video preview region, displaying an editing track of the to-be-processed video in a track editing region, and displaying at least one editing function in an editing function navigation region; and
in response to receiving a trigger operation for an editing function of the at least one editing function, displaying, in the video preview region, a preview image of a processed video obtained by processing the editing function, and displaying, in the track editing region, an editing identifier corresponding to the editing function,
wherein before the receiving a trigger operation for an editing function of the at least one editing function, the method further comprises:
in response to receiving a first selection operation on the editing track of the to-be-processed video, determining a first to-be-processed video clip, that is selected, of the to-be-processed video; and
displaying, in the editing function navigation region, a navigation bar in which a first editing function used to process the first to-be-processed video clip is located.

16. The electronic device according to claim 15, wherein before the receiving a trigger operation for an editing function of the at least one editing function, the method further comprises:
in response to receiving a slide operation on the track editing region, determining a start editing point of the to-be-processed video.

17. The electronic device according to claim 16, wherein when performing a step of in response to receiving a trigger operation for an editing function of the at least one editing function, displaying, in the video preview region, a preview image of a processed video obtained by processing the editing function, and displaying, in the track editing region, an editing identifier corresponding to the editing function, the processor is configured to:
in response to receiving the trigger operation for the editing function, obtain a processing instruction corresponding to the editing function, wherein the processing instruction comprises a function identifier and a processing parameter of the editing function;
determine a second to-be-processed video clip based on the function identifier and the start editing point, and process the second to-be-processed video clip based on the processing parameter to obtain the processed video; and
based on the processed video, display the corresponding preview image in the video preview region, and display, in the track editing region, the editing identifier corresponding to the editing function,
wherein the editing identifier takes the start editing point as a reference point and is aligned with an editing track of the second to-be-processed video clip on a timeline.

18. The electronic device according to claim 17, wherein the processing parameter comprises a media resource identifier corresponding to the editing function,
when performing a step of the processing the second to-be-processed video clip based on the processing parameter to obtain the processed video, the processor is configured to:
obtain a corresponding media resource based on the media resource identifier; and
mount the corresponding media resource on the second to-be-processed video clip, to obtain the processed video.

19. The electronic device according to claim 17, wherein when performing a step of the displaying, in the track editing region, the editing identifier corresponding to the editing function, the processor is configured to:
display, in the track editing region, the editing track corresponding to the editing function, wherein the editing track corresponding to the editing function takes the start editing point as a reference point and is aligned with an editing track of a to-be-processed video clip corresponding to the editing function on the timeline, and the editing track corresponding to the editing function and the editing track of the to-be-processed video clip corresponding to the editing function are at least partially overlapped in a direction perpendicular to an extension direction of the editing track corresponding to the editing function and the editing track of the to-be-processed video clip corresponding to the editing function for overlay display.

20. A non-transitory computer-readable storage medium, wherein the non-transitory computer-readable storage medium stores computer programs, and when the computer programs are executed by a processor, a video processing method is implemented,
wherein the video processing method comprises:
displaying, on a display interface, a preview image of a to-be-processed video in a video preview region, displaying an editing track of the to-be-processed video in a track editing region, and displaying at least one editing function in an editing function navigation region; and
in response to receiving a trigger operation for an editing function of the at least one editing function, displaying, in the video preview region, a preview image of a processed video obtained by processing the editing function, and displaying, in the track editing region, an editing identifier corresponding to the editing function;
wherein before the receiving a trigger operation for an editing function of the at least one editing function, the video processing method further comprises:
in response to receiving a first selection operation on the editing track of the to-be-processed video, determining a first to-be-processed video clip, that is selected, of the to-be-processed video; and
displaying, in the editing function navigation region, a navigation bar in which a first editing function used to process the first to-be-processed video clip is located.

* * * * *